Jan. 6, 1959

G. HIRS

2,867,324

FILTER APPARATUS

Filed March 12, 1956

INVENTOR.
GENE HIRS.
BY
*Wallace P. Lamb*
ATTORNEY.

Jan. 6, 1959

G. HIRS

2,867,324

FILTER APPARATUS

Filed March 12, 1956

INVENTOR.
GENE HIRS.
BY
Wallace P. Lamb
ATTORNEY.

Jan. 6, 1959  G. HIRS  2,867,324
FILTER APPARATUS

Filed March 12, 1956  6 Sheets-Sheet 3

INVENTOR.
GENE HIRS.
BY
ATTORNEY.

Jan. 6, 1959　　　　　G. HIRS　　　　2,867,324
FILTER APPARATUS
Filed March 12, 1956　　　　　　　6 Sheets-Sheet 4

Fig. 11

INVENTOR.
GENE HIRS.
BY
ATTORNEY.

Jan. 6, 1959

G. HIRS 2,867,324

FILTER APPARATUS

Filed March 12, 1956

INVENTOR.
GENE HIRS.
BY
Wallace P. Lamb
ATTORNEY.

United States Patent Office 2,867,324
Patented Jan. 6, 1959

2,867,324

FILTER APPARATUS

Gene Hirs, Detroit, Mich.

Application March 12, 1956, Serial No. 571,020

4 Claims. (Cl. 210—97)

This invention relates generally to filter apparatus and particularly to pressure filtering apparatus having automatic replacement of a filter medium.

It is an object of my invention to provide an improved fluid filtering apparatus of the pressure feed type which increases the efficiency of industrial and other large volume filtering with accompanying decrease in cost of filtering operation.

Another object of my invention is to provide an improved pressure filter head of spaced head components and gasket therebetween to receive an elongated filter media which is movable along a path of travel to replace the filter medium within the head without moving the head components.

Another object of my invention is to provide for a pressure feed fluid filter an improved filter head including an inflatable gasket to close and seal the joint between spaced components of the head and a filter medium, and deflatable to provide clearance for automatic replacement of the filter medium.

Another object of the invention is to provide a hollow inflatable gasket which can be deflated to permit unobstructed replacement of the filter medium and can be inflated to provide a fluid tight joint with the filter medium and filter head.

Another object of the invention is to provide a control system for controlling inflation and/or deflation of the gasket in response to a condition of the fluid as a function of clogging of the used filter medium.

Another object of the invention is to provide a filter apparatus having an improved closure and gasket element.

Other objects of the invention will become apparent from the following detail description, taken in connection with the accompanying drawings in which.

Referring first to Figs. 1 to 10 inclusive, the apparatus shown comprises, in general, a support or standard 20, a filter head 22, a filter media 24, and a filter media feed and indexing machine 26. The filter head 22 and machine 26 are mounted on the standard 20 and arranged such that the filter media 24 extends through the head to filter liquid passing therethrough. The machine 26 is adapted when operated to remove the used filter medium and foreign matter clogging it and replace the medium. Replacement of the filter medium requires moving it transversely to and through the head until a clean portion of the filter media is within the head. This operation requires clearance between the head and the filter media, and it is the closing of the clearance space and sealing of the filter medium to the head around the periphery thereof after replacement has been made that is the principal feature of my invention.

The standard 20 may be of any suitable type, such as the frame structure shown having four spaced uprights 30 rigidly connected together by cross members 32. These uprights 30 and cross members 32 may be welded or be otherwise suitably secured together. If desired, the frame structure may be enclosed by sheet metal panels, as shown, to form a housing type structure.

The filter head 22 comprises an inlet fluid conductor or shell 34 and an outlet fluid conductor or shell 36. The shells 34, 36 are located inwardly of the uprights 30 and are spaced therefrom by spacer members 38 which may be welded or be otherwise suitably secured to the shells and uprights. As shown, the shells 34, 36 are vertically spaced apart sufficiently to allow clearance for passage therebetween of the filter media and for a feed means or conveyor belt 40 on which the filter media 24 is supported and advanced on replacement of the filter medium in the head. The opposed edge surfaces of shells 34, 36 are frames, designated 41, which frame that portion of the media within the filter head, and preferably the surfaces of said frames are extended by flanges 44 to provide added sealing surfaces. These frames may be rectangular, as shown, or any other desired shape.

In order to clase the space between the opposed surfaces of the frames 42 and seal the filter medium thereto for filtering operation, I provide an expansible-contractable closure member or gasket in the form of an inflatable rubber tube 46 for each of the frames 42. These expandable gaskets 46 extend entirely around the opposed frame surfaces in registry with each other and in contact with said surfaces. The gaskets may be bonded respectively to the opposed frame surfaces or may be attached thereto in any suitable manner. The normal diameters of the gaskets 46 are such that when the gaskets are deflated, the filter media 24 and its feed belt 40 are free to move without interfering with the head when replacing the filter medium therein. After the filter medium has been replaced, the gaskets 46 are inflated by a predetermined pressure such that the gaskets close and seal the clearance space between the shells of the head, and engaging the filter media 24 and its supporting belt 40 form a fluid tight seal therewith.

Figures 9, 10:
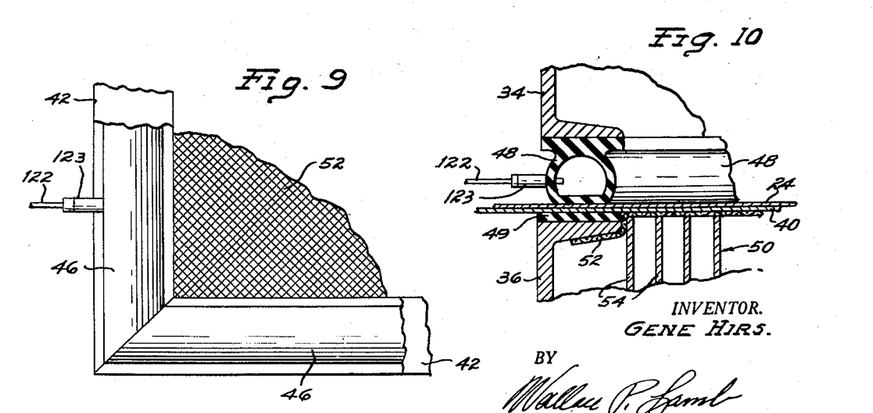
Fig. 9 is a fragmentary plan view taken along line 9—9 of Fig. 8.
Fig. 10 shows a modification of Fig. 7.

Fig. 10 shows a modification of the above described head-gasket construction in which only one gasket, designated 48, is used to form a fluid tight joint around the peripheries of frames 42. The inflatable gasket 48 may be bonded or otherwise attached to one of the frames 42, and a displaceable resilient gasket 49 may be used on the other frame, if desired.

To give support to the portion of the belt 40 within the filter head, a grate 50 may be provided in the lower shell 36 and be covered with screening 52. As shown in Figs. 7 to 10, the grate 50 comprises the usual spaced bars 54 which may be welded to angle member 56 which in turn may be welded to opposite sides of the lower shell 36. The screening 52 rests on the upper edges of the grate bars 54 and may be suitably attached to the shell flanges 44.

The filter media may be made of any suitable material, such as thin porous paper, and the feed belt 40 may be made of fabric or other suitable porous material.

The top of the upper shell 34 may be open where the liquid to be filtered is supplied by gravity flow, as in the present disclosure. In such apparatus, liquid from a source of supply, such as a reservoir (not shown) may be conducted to upper shell 34 by means of a suitable conduit 58. A valve 59 is provided to control flow from conduit 58 into shell 34 and may be operated by a float 60 to maintain a predetermined liquid level in shell 34 above the filter medium. To avoid overflow, in the event of failure of float 60 to maintain said predetermined level, a suitable overflow relief drain or pipe 62 may be provided.

To effect a high rate of filtration so as to filter large quantities of liquid, the liquid is forced through the filter medium by a suction or exhaust pump 64. The pump 64 may be driven by an electric motor 66. In addition to forcing the liquid through the filter medium, the pump 64 may be used, if desired, to return the filtered liquid to the point or points of use of the liquid. It will be apparent that instead of the exhaust pump, a pressure pump may be used in apparatus where the upper shell is closed.

The filter media feed belt 40 is of the endless type and may travel about guide rolls 68 on parallel shafts 70, 72, spaced apart on opposite sides of the filter head 22. These shafts 70, 72 are journaled on extension supports 74, 76 respectively which are secured to the uprights 30. Shaft 70 is the driving shaft at the discharge end of the conveyor, and, of course, shaft 72 is the driven shaft at the feed end of the conveyor. An electric motor 75 may be used to drive shaft 72.

Figures 1, 3, 4:
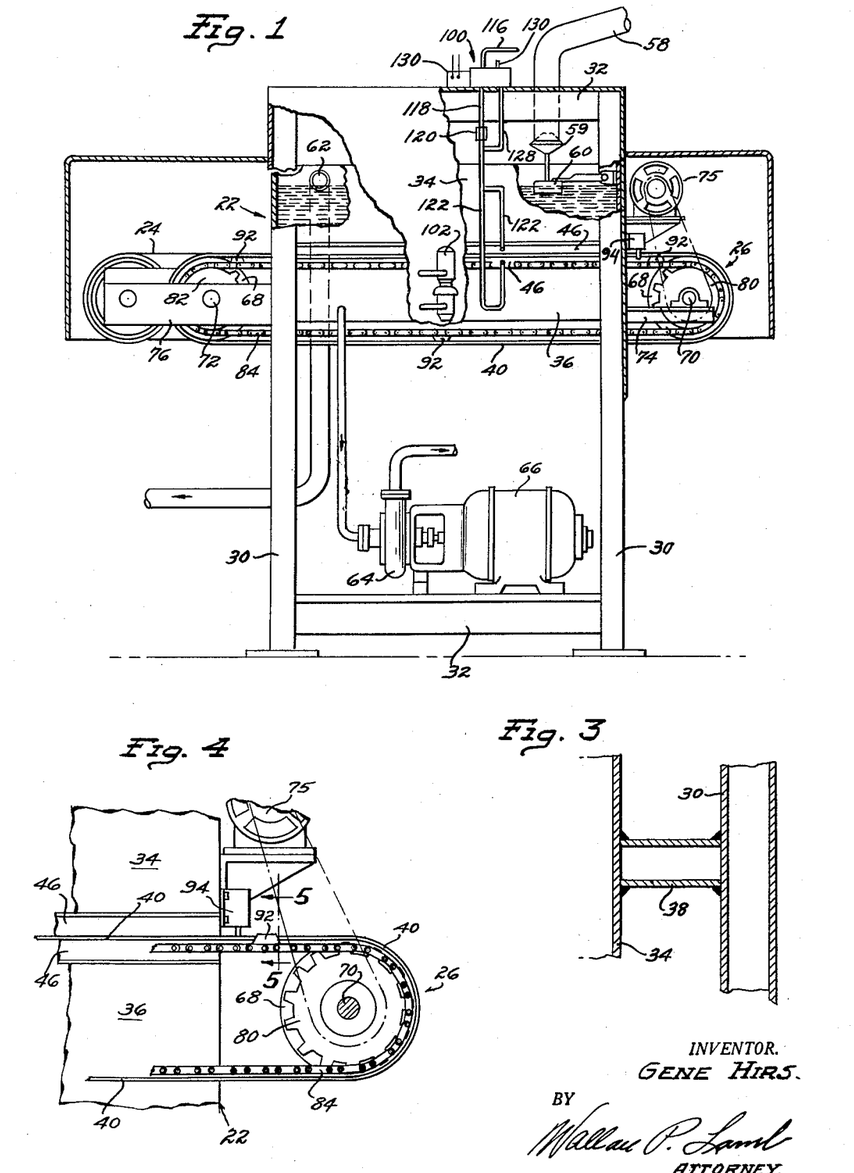
Fig. 1 is an elevational view of a fluid filtering apparatus having parts broken away and in section, embodying features of my invention.
Fig. 3 is a vertical sectional view of the apparatus showing a structural detail.
Fig. 4 is an enlarged fragmentary view, taken along line 4—4 of Fig. 2.
Figure 2:
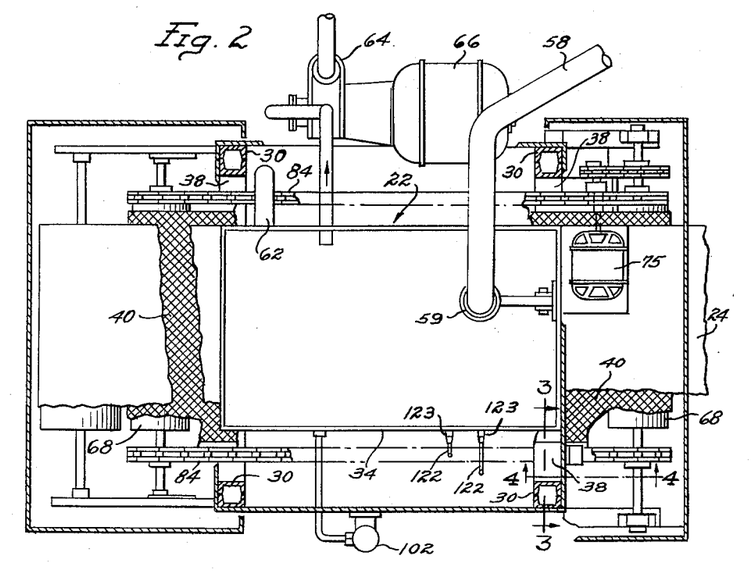
Fig. 2 is a plan view of the apparatus having parts broken away and in section.
Figure 5:
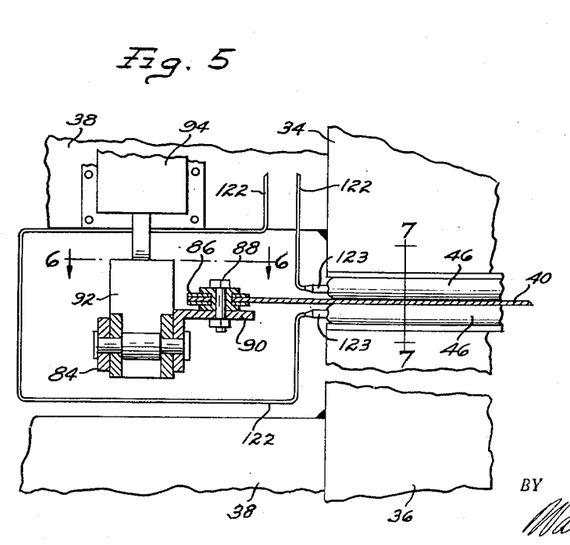
Fig. 5 is an enlarged fragmentary view, taken along line 5—5 of Fig. 4.
Figure 6:
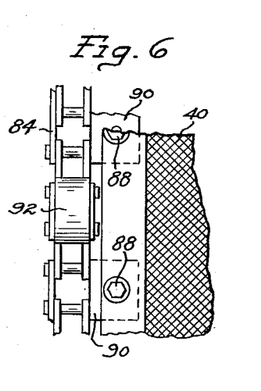
Fig. 6 is a fragmentary plan view, taken along line 6—6 of Fig. 5.
Figure 7:
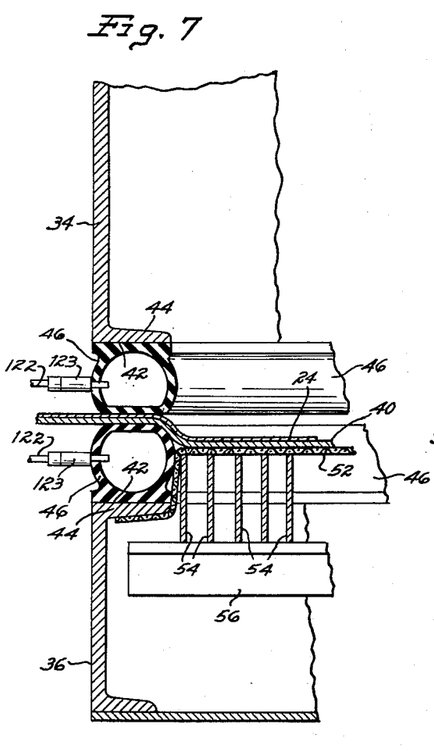
Fig. 7 is an enlarged fragmentary sectional view, taken along line 7—7 of Fig. 5 showing the positions of the parts during filtering operation.
Figure 8:
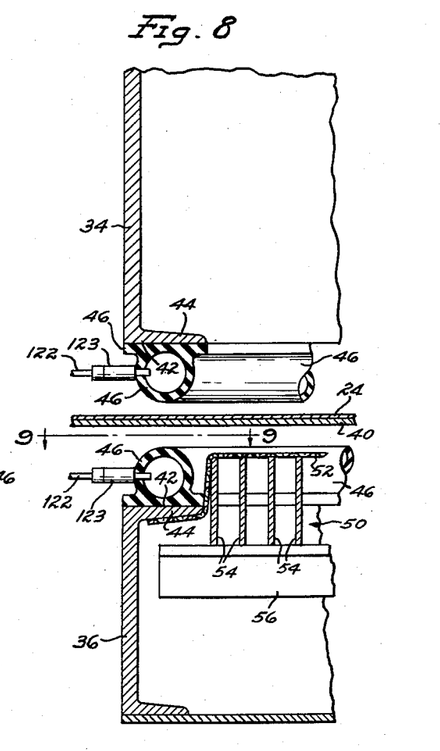
Fig. 8 is a view similar to Fig. 7 showing the positions of the parts during replacement of the filter medium.

A pair of driving sprockets 80 is fixed to the driving shaft 70 outwardly at the belt guide roll 68, and a second pair of sprockets are provided and similarly arranged on driven shaft 72. Around the corresponding sprockets travel chains 84 and the belt 40 is attached to said chains to travel therewith. To this end, the belt 40, Figs. 5 and 6 is provided along its opposite edges with a reinforcing binding 86 which may be secured by bolts 88 to laterally extending lugs 90, carried by chains 84.

When the conveyor belt 40 travels a distance such that a clean portion of the filter media 24 is positioned between the filter frames 42, a cam or lug 92 on one of the chains 84 engages and operates a limit switch 94 to stop the conveyor drive motor 75. In this particular arrangement there are three of the lugs 92, equally spaced apart distances corresponding to the distance of travel of the filter media required for replacing the used medium in the filter head 22.

The filtering apparatus is automatic with regard to replacement of the filter medium and resumption of the filtering operation. To accomplish this, a control system is provided of a character such that a cycle of operations are performed automatically to replace the used filter medium in response to a predetermined clogging of the used medium. With particular reference to the diagrammatic view of Fig. 11, the control system includes a valve 100 which controls inflation and/or deflation of the gaskets 46, a liquid level responsive control 102 which prevents deflation of gaskets 46 until the liquid level in head 22 is below the gasket joints, and a shut-off valve 104 which interrupts liquid flow to head 22 during replacement of the filter medium. The controls and the conveyor motor 75 are all under the control of a switch 106 which is responsive to a predetermined decrease in pressure in lower shell 36 as a function of the degree of clogging of the filter medium. That is, when clogging of the filter medium by accumulation of foreign matter on the filter medium becomes such that the filter rate drops to a point where continued operation of the suction pump 64 decreases the pressure in shell 36 to a predetermined pressure, then the switch 106 operates to initiate the above mentioned cycle of operations to effect replacement of the filter medium.

Figure 11:
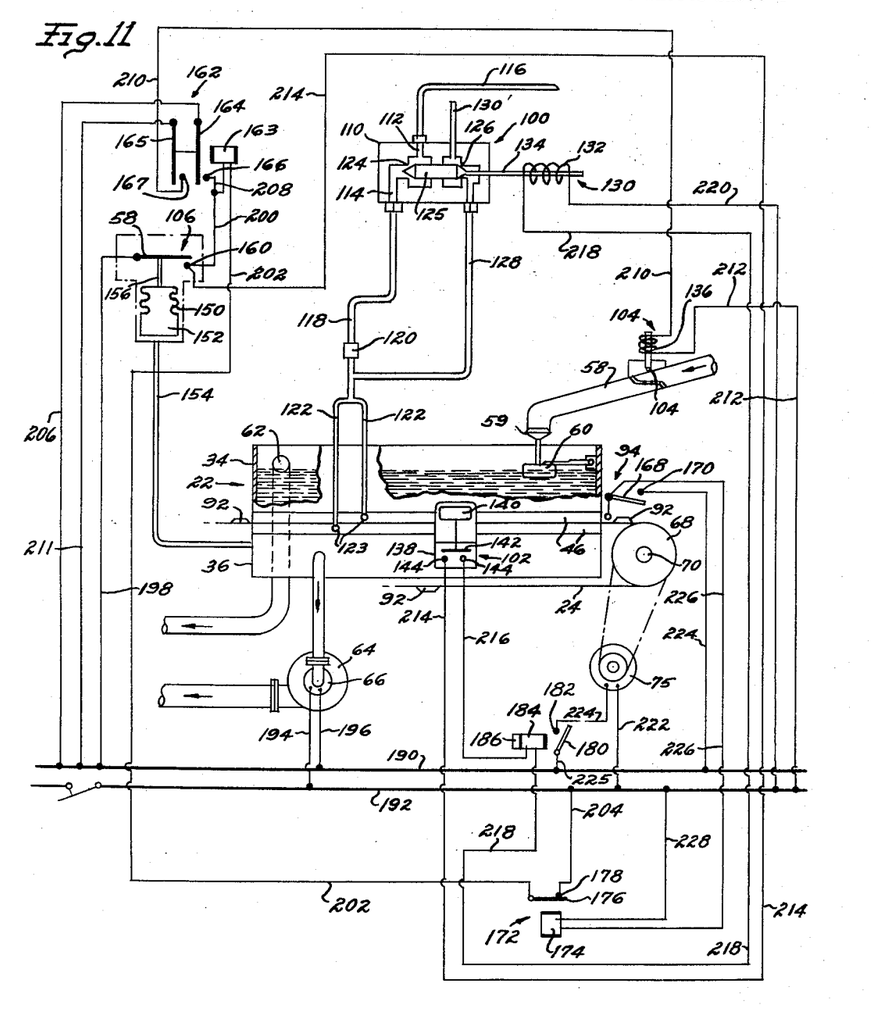
Fig. 11 is a diagrammatic view of my apparatus showing the circuitry and controls therefor.

The control valve 100 may be of any suitable type, the valve shown being diagrammatically represented as having a body 110, provided with an inlet 112 and an outlet 114. A conduit 116 connects the valve inlet 112 to a source of compressed air. The valve outlet 114 is connected by a conduit 118 to a pressure regulator 120 which is connected by separate conduits 122 respectively to fittings 123 on the inflatable gaskets 46. Inflation and deflation of the gaskets 46 are controlled by a movable valve member 125 within the valve body 110. One end of the valve member 125 has a head controlling a port 124 between the air inlet 112 and outlet 114. The other end of the valve member 125 has a head controlling a port 126 through which air is vented to atmosphere when the gaskets 46 are to be deflated. The venting arrangement may include a port 126 which is connected by a conduit 128 to air supply conduit 118, and by a vent 130 to atmosphere whereby when port 126 is open the gaskets 46 are open to atmosphere and are deflated.

A solenoid 130 may be used to operate valve member 125 and is illustrated as comprising a coil 132 and a movable core 134. The core 134 is suitably connected to the valve member 125. Normally, the valve member 125 is biased to the position shown in which the air port 124 is open and the air vent 126 is closed. In this position of valve member 125, the gaskets 46 are inflated and filtering of the liquid in progress. However, when solenoid 132 is energized, port 124 is closed to air flow and port 126 is opened thereby relieving the pressure in gaskets 46 and allowing them to deflate preparatory to replacement of the filter medium.

The valve 104, controlling gravity flow, of liquid to be filtered, to shell 34 may be operated by a solenoid including a solenoid coil 136. In the present arrangement, coil 136 is normally deenergized, i. e., during filtering operation, valve 104 being biased to open position, as shown.

Any suitable liquid level control may be used to delay deflation of gaskets 46 until the liquid level in the filter head 22 decreases below the joints sealed by the gaskets 46. The liquid level control 102 comprises essentially a casing 138 having a float chamber in communication with the interior of shell 36, and a float 140 in said chamber to actuate a switch 142. The switch 142 is arranged to make and break contact with a pair of contacts 144 in accordance with the height of the liquid level in shell 136.

The primary control 106 is a pressure responsive type having a diaphragm or bellows 150 forming in part a chamber 152 which is in communication with shell 36 by a connecting conduit 154. A connecting rod 156 connects the movable end of bellows 150 to a switch 158 which is normally open and is arranged to engage a contact 160 when the pressure in shell 36 is decreased by the suction pump 64 to a predetermined set pressure below atmospheric pressure. The pressure responsive switch 106 operates a relay 162 which comprises as coil 163 and a pair of switches 164, 165 which operate in unison and respectively cooperate with contacts 166, 167.

The switch 164 is normally open whereas switch 165 is normally closed.

The conveyor operated limit switch 94 is represented diagrammatically as comprising a switch 168 and a contact 169, and this switch operates a relay 170 to limit travel of the conveyor belt to the distance required to replace the filter medium. The relay 170 comprises the usual coil 171, a switch 172, and a contact 174. As shown, relay 170 is normally closed in the present arrangement. In series circuit with conveyor motor 75 is a switch 176 and contact 178 of a delayed action relay which includes a coil 180. Coil 180 may be provided with a dash-pot 181, or equivalent means to delay operation of the switch 176, the purpose of which is hereinafter described in detail.

In the circuitary of the control system, the main or 115 v. lines are designated by the numerals 190, 192, and the pump motor 66 is connected across the lines by motor leads 194, 196 so that the pump operates continuously when the machine is in use.

A lead 198 connects the pressure responsive switch 58 to main lead 190 and the pressure switch contact 160 is connected by a lead 200 to one end of relay coil 163. The other end of relay coil 163 is connected by a lead 202 to relay switch 176, the cooperating contact of which is connected by a lead 204 to main lead 192. Relay switch 164 controls a holding circuit for coil 163 and includes a lead 206 which connects switch 164 to main lead 190, and a lead 208 which connects contact 166 to the coil lead 200. The normally closed relay contact 167 is connected by a lead 210 to one end of solenoid coil 136 which has its other end connected by a lead 212 to main lead 192, and the switch 165 is connected by a lead 211 to main lead 190. It will be seen that since relay contacts 165, 167 are normally closed, solenoid coil 136 is normally energized holding valve 104 open.

The pressure responsive switch contact 166 is also connected by a lead 214 to one of the liquid level control contacts 144 of which the other contact is connected by a lead 216 to one end of the limit switch relay coil 184. The other end of coil 184 is connected by a lead 218 to one end of the solenoid coil 130 which has its other end connected by a lead 220 to the main lead 192. Thus, it will be seen that when the pressure responsive relay 162 is energized, the liquid valve solenoid 136 is deenergized and the air valve solenoid 130 is energized when the liquid level switch 102 closes.

A lead 222 connects one terminal of the conveyor motor 75 to main lead 192, and a lead 224 connects the other motor terminal to contact 182 of the delayed action switch which is connected to main lead 190 by a lead 225. The conveyor actuated switch 94 is connected by lead 226 to one end of relay coil 174 which has its other end connected by a lead 228 to main lead 192.

*General operation*

With the controls in the positions shown, the apparatus is in filtering or normal operation, the liquid to be filtered being conducted by gravity through conduit 58 to the upper shell 34 and being forced through the filter medium 24 by the continuously operating suction pump 64 to effect a high filter rate and accompanying efficiency. The liquid elvel in the upper shell 34 is maintained at the desired level by the float actuated valve 59 controlling gravity feed of liquid to the shell 34. If for some reason the valve 59 should fail, excess liquid is drained from the filter head by drain 62 to avoid overflow of the upper shell 34. When the foreign matter filtered from the liquid accumulates on the filter and decreases flow therethrough, the suction 64 will, of course, correspondingly decrease the pressure in shell 36. When the pressure in shell 36 decreases to a predetermined pressure, the pressure responsive switch 106 will function to energize solenoid coil 136 to stop flow of liquid to shell 34. Also, the pressure switch 106 will function to operate valve 100 to deflate the expansible gaskets 46 providing that the liquid level switch 142 is closed. In addition, closing of the pressure responsive switch 106 with contact 160 energizes the delayed action relay 184 which after an interval calculated to allow for deflation of the gaskets 46, acts to start the conveyor motor 75. The motor 75 then operates the conveyor belt 40 to move the used filter medium out of the head 22 and replace the used medium with a clean filter medium. Upon completion of the filter medium replacement operation, one of the conveyor chain carried cams 92 engages and closes limit switch 94 and holds it closed for a short interval. This energizes relay 172 which then acts to break the circuit of motor 75 to discontinue feeding of the filter media through head 22, the distance traveled being calculated as approximately equal to the width of the head. Also when relay 172 breaks the circuit to conveyor motor 75, the circuit is broken to relay 162 and as a consequence, valve 100 is returned to the gasket inflating position shown. In addition, solenoid coil 136 is again deenergized and opens valve 104 to resume filtering until the filter media again needs replacement.

*Detail operation*

During normal or filtering operation, the several controls are in the positions shown in Fig. 11. This includes the pressure switch 106 in open circuit position by reason of the pressure in lower shell 36 being above the pre-set pressure of the switch. As a consequence, relay coil 163, air valve solenoid 130, and liquid control valve 104 are all deenergized. Under these conditions, the inflatable gaskets 46 are inflated; the liquid to be filtered is flowing through conduit 58 to head 22, and the suction pump 64 is operating to force feed the liquid through the filter medium. As the filtering operation continues, foreign matter filtered from the liquid accumulates on the filter medium with accompanying decrease in the filtering rate. When the filter rate decreases such that the output is less than the suction capacity of the pump 64, a decrease in pressure is effected in shell 36 and when the pressure decreases to that for which switch 106 is set, the switch is actuated and engages contact 160. The closing of these contacts completes the following circuit to energize relay coil 163. From main line 190, through lead 198, switch 58, contact 160, lead 200, relay coil 163, lead 202, relay contacts 176, 178, back to the other main line 192 through lead 204. Completion of this circuit closes relay switches 164 and 165. The closing of switch 164 establishes the following holding circuit for relay coil 163 to maintain the latter energized when switch 106 opens on resumption of normal pressure in shell 36: From main line 190, through lead 206, closed contacts 164, 166, relay coil 163, lead 202, closed relay contacts 176, 178 and through lead 204 to the other main line 192. Also when switch 164 closes, the following circuit is closed when the liquid level control 102 closes its switch: From main lead 190, through lead 206, closed relay contacts 164, 166, lead 200, contact 160, lead 214, liquid level control contacts 142, 144, lead 216, relay coil 184, lead 218, air valve solenoid coil 132, and lead 220 to the other main line 192. At the same time, the following circuit is completed to coil 136 of the liquid supply control 104: From the main line 190, through lead 211, closed relay contacts 165, 167, lead 210, solenoid coil 136, and through lead 212 to the other main line 192. Thus, when relay coil 163 is energized, coil 136 of the liquid supply valve 104 is energized, and the air valve solenoid coil 132 is energized when the liquid level responsive float 142 engages contacts 144. When coil 136 is energized, the valve 104 seats to stop flow of liquid to the filter head 22. Thereafter, the liquid level in the head 22 decreases and when the level decreases below the joints formed by the inflatable gaskets 46, the float 140 closes switch 102 to complete the circuit to the air valve solenoid coil 132. When the coil 132 is energized, valve 125 engages its seat 124 to close-off communication between the source of compressed air and the inflatable gaskets 46 and opens port 126 to vent the gaskets to atmosphere. When deflated, the gaskets 46 are sufficiently spaced apart to allow clearance therebetween for unobstructed movement of the filter media to replace the used filter media. Although the air valve coil 132 and the relay coil 184 of the filter media feed motor 75 are energized simultaneously and deflation of the gaskets is instantaneous, it may be desirable to use the delay action type of relay as a safety measure against the possibility of the conveyor moving before the gaskets clear the conveyor belt. When the relay contacts 180, 182 engage, the motor 75 operates to drive the conveyor and move the filter media 24, the used media moving out of the filter head 22 and replaced with a clean portion of the media. When the filter media has been replaced, one of the cams 92 closes switch 94 which energizes relay 172. This opens the circuit of the holding contacts 164, 166 whereby all controls of the system are deenergized, returning them to the positions shown. The air valve 125 opens to inflate the gaskets 46 to close and seal the clearance space between shells 34, 36, and valve 104 opens to resume supply of liquid to be filtered to the shell 34 of the filter head.

In the diagrammatic illustration of Fig. 11, the several controls have been shown symbolically to avoid the showing of unnecessary complicated views, but in practice it is preferable that said controls, such as the valves and switches be of the so-called snap acting type.

In Figs. 12 to 16, I have shown my invention embodied in an apparatus for filtering gases, the particular apparatus shown being adapted to remove dust and other foreign matter from air. The apparatus has a support and housing or air conductor 230 which is interposed in and forms part of an air flow duct between two connecting duct sections 232 and 234 thereof. In addition to the air conductor 230, my apparatus comprises in general a filter medium 236, a filter media feed or conveyor 238, and an expansible-collapsible closure and seal or hollow gasket 240. In the arrangement shown in Fig. 12, the filter medium 236 extends vertically through the air conductor 230 in the path of the air flow; the conveyor 238 is arranged within the air conductor, adjacent to and on the outlet side of the filter medium, and the gasket 240 is arranged within the air conductor on the inlet side of the filter media. Any well known type of fan (not shown) may be used to induce air flow through the filter medium in the direction indicated by the arrows.

Figure 12:
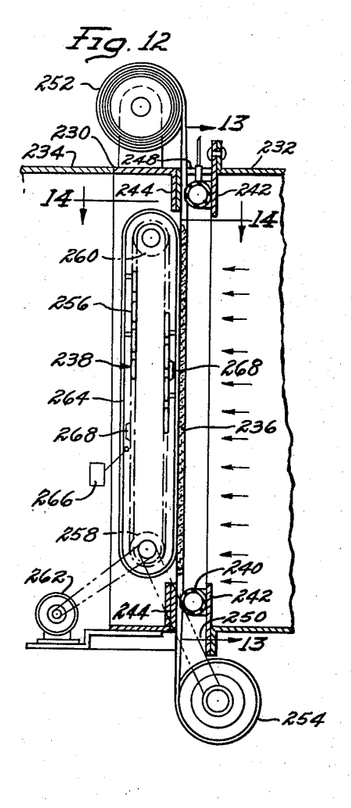
Fig. 12 is a modification of my filtering apparatus particularly suited for filtering air or other gases.

The air conductor 230 is rectangular in cross section in the present disclosure, and extending around the inner periphery thereof is a pair of spaced, continuous frames or flanges 242, 244. These frames 242 and 244 provide mounting and sealing surfaces for the filter media 236 and the gasket 240. The gasket 240 is a continuous, rectangular gasket adapted to be disposed between the frames 242, 244. The gasket 240 is mounted on frame 242 and extends entirely around the periphery thereof, as shown. Spaced straps or bands 246 of rubber or other expandable contractable material may be used to hold the gasket 240 to the frame 242.

Figure 14:
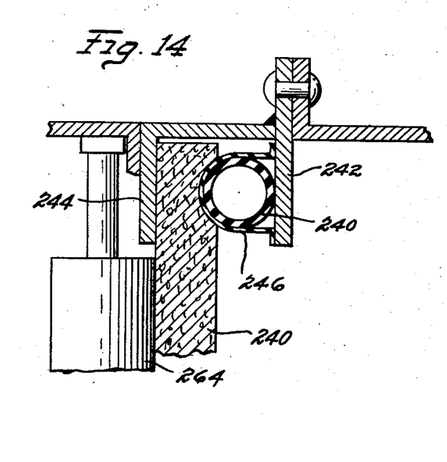
Fig. 14 is a cross sectional view taken along line 14—14 of Fig. 13 showing my expansible seal inflated.
Figure 15:
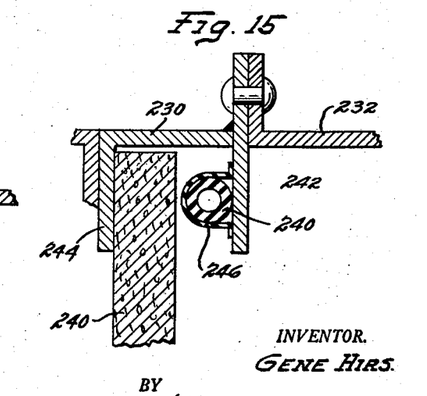
Fig. 15 is a view similar to Fig. 14 showing the seal deflated.

The filter media 236 extends into the air conductor 230 through a slot 248 in the top thereof and between frame 244 and the gasket 240 and then out of the bottom of the conductor through a slot 250. As shown in Figs. 14 and 15, the filter media overlaps the sides of frame 244 and when the gasket 240 is expanded, the filter media is pressed against frame 244 around the entire periphery thereof to seal against passage of air around the edges of the filter medium. The space between the frames and the expansion of the gasket 240 is calculated such that upon deflation of the gasket there will be sufficient clearance to allow free movement of the filter media, as illustrated in Fig. 15.

The filter media 236 may be unwound from a roll 252 which may be suitably mounted on top of the air conductor 230, and the clogged filter media may be wound onto a driven spool 254 at the bottom of the air conductor.

Figure 13:
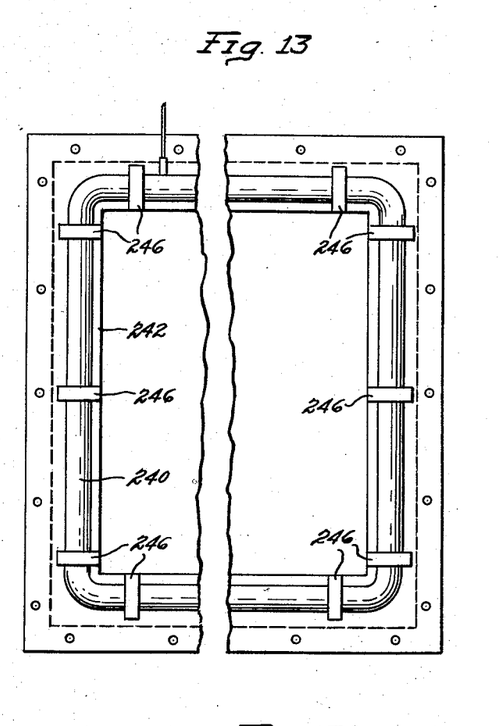
Fig. 13 is a view of the apparatus, taken substantially along line 13—13 of Fig. 12.

The conveyor 238 is similar to the conveyor 26 of my liquid filter and therefor a repetitious description of the conveyor details is deemed unnecessary to an understanding of the invention. In general, the conveyor 238 includes a pair of spaced continuous chains 256 which travel about drive sprockets 258 and driven sprockets 260. An electric motor 262 drives the sprockets 258 and also drives the spool 254 on which the used filter media is wound. The conveyor chains 256 carry a belt 264 which is arranged with its lead side flat against the filter media to move the same by friction. The belt 264 may be made of fabric or other material that is suitably porous to allow passage of the air therethrough. Thus, it will be seen that the belt has the dual function of a feed means and a backing means for the filter medium within the air conductor 230. In this connection, it will be apparent that, if desired, the conveyor may be replaced with a backing screen and the filter media moved by driving the wind-up roll 254. In either arrangement, it is necessary to stop the filter media when the used part thereof has been replaced and to this end, a limit switch 266 may be used. The switch 266 is operated by spaced cams 268 that are carried by the conveyor chains spaced apart to engage and operate the switch 266 when the filter media has been replaced.

Figure 16:
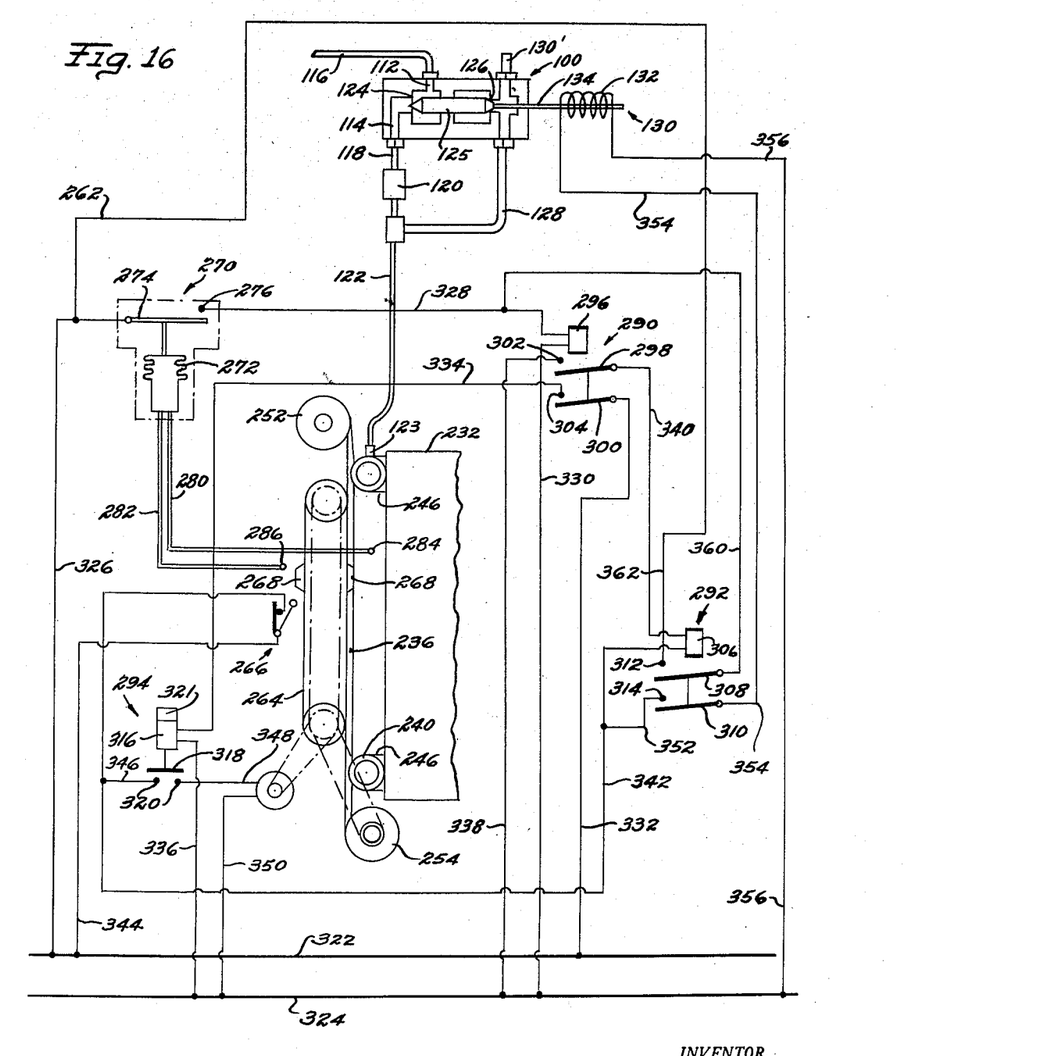
Fig. 16 is a diagrammatic view of the modification of Fig. 12 including circuitry and controls.

Referring now more particularly to Fig. 16, the control system shown for automatically controlling replacement of the filter media 236 includes a control or air valve 130 and a pressure responsive control or switch 270. The valve 130 controls expansion and/or contraction of the gasket 240, and the pressure switch 270 controls operation of the valve 130 in response to a predetermined increase in pressure differential on opposite sides of the filter medium 236.

The valve 130 is the same as the valve shown and described in my liquid filtering system of Fig. 11, and therefor like characters of reference have been given like parts to avoid repetitious description.

The pressure responsive control 270 includes a bellows 272 connected to actuate a switch 274 which cooperates with a fixed contact 276. The bellows 272 forms part of an expansible-contractible chamber 278 which is connected by separate conduits 280, 282 to pressure responsive elements 284, 286 that are arranged on opposite sides of the filter medium 236. Any of the well known differential pressure responsive controls may be used.

The control system further includes a relay 290, a second relay 292, and a motor relay 294. These relays are connected in circuit to effect the desired automatic cycle of operations necessary to replace the used filter medium. Relay 290 controls relay 292 and motor 294, and relay 292 controls the air valve 130 and a holding circuit for relay 290.

Relays 290 and 292 may be of the well known conventional types, as shown. Relay 290 comprises the usual coil 296, a pair of switches 298, 300 that operate in unison, and a pair of contacts 302, 304 which cooperate respectively with switches 298, 300. Similarly, relay 292 includes a coil 306, a holding circuit switch 308, and an air valve controlling switch 310. Switches 308 and 310 cooperate respectively with contacts 312 and 314.

The motor relay 294 comprises a coil 316 operating a normally open switch 318 which is adapted to bridge a pair of contacts 320. To insure that the conveyor 264 does not operate before the gasket 236 has deflated to provide conveyor clearance, relay 294 is of the delayed action type having a dash-pot 321 or equivalent means to effect, a delay interval in the closing of switch 318.

The numerals 322 and 324 designate the main electric power lines which may be the currently conventional 115 v. lines. From main line 322, a lead 326 connects to the pressure switch 274 and from the switch contact 276, a lead 328 connects to one end of relay coil 296 which has its other end connected by a lead 330 to the other main line 324. Thus, when the pressure responsive switch 274 closes, the relay coil 296 is energized which closes switches 298 and 300. From main lead 322, a lead 332 connects to relay switch 300, and a lead 334 connects relay contact 304 to one end of the motor relay coil 316 which has its other end connected by a lead 336 to the other main line 324. When relay switch 300 closes, the motor relay coil 316 is energized. From main line 324, a lead 338 connects to relay contact 302 and a lead 340 connects relay switch 298 to one end of relay coil 306. From the other end of relay coil 306, a lead 342 connects to the normally closed contact of limit switch 266 which is connected by a lead 344 to main line 324. The motor relay contacts 320 are respectively connected by a lead 346 to lead 342 and by a lead 348 to one terminal of motor 262, the other terminal of the motor connected by a lead 350 to the main line 324.

The valve relay switch contact 314 is connected to lead 342 and thus to main line 322 by a lead 352, and the relay switch 310 is connected by a lead 354 to one end of solenoid coil 132; the other end of coil 132 connected by a lead 356 to main line 324. Thus, when relay switch 310 closes, solenoid coil 132 is energized moving valve 125 to the left to shut off the air pressure and open the vent to effect contraction of the inflatable gasket 246.

The circuit holding relay switch 308 is connected by a lead 360 to the lead 328 of relay coil 296, and relay contact 312 is connected by a lead 362 to lead 326 and therefore to main line 322. The holding circuit is provided to keep the controlling relay coil 296 energized during completion of the filter medium replacement operation so that when pressure switch 274 opens in response to the decreasing pressure differential on opposite sides of the filter medium, the replacement operation will not be interrupted.

*General operation*

With the various operating devices and controls in the positions shown in Fig. 16, air is being filtered as it passes through the filter medium 236. As previously mentioned, a suitable suction fan may be used to force air through the filter medium 236 and the fan may operate continuously. The filter medium 236 filters out dust and other foreign matter from the air passing therethrough and the dust and other foreign matter are caught by the filter medium and gradually decrease rate flow therethrough with accompanying increase in pressure differential on opposite sides of the filter medium 236. When the pressure differential increases to the differential for which switch 274 is set to close, air valve 100 is actuated to cause deflation of gasket 240 and also energizes the delayed action motor relay 290. Gasket 240 deflates to break the seal with filter medium 236 and give clearance for unobstructed movement of the filter media for replacement purposes. After a short interval, calculated to insure deflation of the gasket 240, motor 254 operates to advance the filter media to remove the used filter medium and replace it with a clean medium. When the used filter medium has been replaced, one of the conveyor carried cams 268 trips the limit switch 266 which stops the conveyor motor 262 and also deenergizes air valve 100 to again inflate the gasket 240.

*Detail operation*

When the filter medium 236 becomes clogged with dirt and other foreign matter such that the pressure differential on opposite sides of the filter medium reaches a predetermined differential, then pressure switch 274 engages its contact 276 and completes the following circuit to energize control relay coil 296 and close switches 298 and 300: From main line 322, through lead 326, pressure switch contacts 274, 276, lead 328, relay coil 296 and lead 330 to the other main lead 324. The closing of relay switch 300 completes the following circuit to the motor control relay 294: From main line 322, through lead 332, switch 300, contact 304, lead 334, motor relay coil 316, and through lead 336 to the other main line 324. At the same time, the closing of relay switch 298 completes the following circuit to the air valve relay coil 306: From main line 324, through lead 338, relay contact 302, switch 298, relay coil 306, lead 342, limit switch 266, and through lead 344 to the other main line 322. Energization of coil 306 closes switch 310 to energize the air valve solenoid 130 and closes switch 308 to effect a holding circuit for the control relay coil 296. The air valve solenoid circuit is as follows: From main line 324 through lead 356, solenoid coil 132, lead 354, relay switch 310, contact 314, leads 352, 342, limit switch 266, and lead 344 to the other main line 322. The holding circuit is completed from main line 322, through leads 326, 362, relay contact 312, switch 308, lead 360, control relay coil 296, and lead 330 to the other main line 324. Thus, it will be seen that when the pressure responsive switch 270 engages its contact 276, the air valve solenoid 130 and the motor control relay are simultaneously energized and a holding circuit established for control relay 290 to prevent opening of the circuits when the pressure switch 270 opens.

When the air valve solenoid 130 is energized, the valve member 125 is moved to the left to shut-off the air pressure and vent the gasket 240 to atmosphere whereby to deflate the gasket so that the filter media can move without interference. Following deflation of gasket 240, the delayed action relay 294 starts motor 262 to start the conveyor 264 and move the filter media, rolling the filter media off of roll 252 and onto the used roll 254. When the used filter medium has been replaced, one of the conveyor carried cams 268 trips the limit switch 266 which breaks the holding circuit of relay coil 296 which returns the valve 100 to its normal position. When moved to this position, the gasket 240 is again inflated; motor 262 is stopped and the relays return to the positions in which they are shown.

While I have shown and described my invention in great detail, it is to be understood that the invention is to be limited only by the spirit and scope of the appended claims.

What I claim is:

1. A fluid filtering apparatus comprising, a pair of frame members for interposition in a fluid flow line and having spaced opposed fixed surfaces, a filter medium disposed between said frame member surfaces, said filter medium passable between said surfaces for replacement of the filter medium, means operable to move said filter medium, a gasket between said surfaces clearing the filter medium during replacement and displaceable to close the space around the peripheries of the frame member surfaces to seal the joints between the surfaces and the filter medium after replacement thereof, means operable to displace said gasket, and a control responsive to predetermined movement of said filter medium to control said last-named means.

2. In a fluid filter apparatus, supporting means, an upper filter head shell, a lower filter head shell, said shells mounted against movement on said supporting means and having spaced opposed open ends, said upper shell having an inlet for liquid to be filtered and said lower shell having an outlet for the filtered liquid, a filter media extending through the space between the opposed open ends of said shells, said filter media movable to replace the portion thereof between said shells, feed means operable to move said filter media, a hollow inflatable gasket between the open ends of said shells, said gasket when deflated clearing said filter media to allow unobstructed movement thereof and when inflated engaging said filter media and the spaced ends of said shells to provide a sealed joint between the shells, means normally acting to inflate said gasket, a control responsive to change in pressure on one side of said filter media, a control responsive to liquid level in said lower shell, said controls mutually controlling said means to deflate said gasket and also said filter media feed means, and a delayed action control delaying operation of said feed means by said responsive controls to allow for deflating of said gasket before operation of said feed means.

3. A fluid filtering apparatus comprising, a pair of frame members for interposition in a fluid flow duct and having opposed surfaces spaced apart in fixed relation, a filter media extending between the fixed opposed surfaces of said frame members and movable to replace the portion of said media between said frame members, a hollow gasket between the spaced surfaces of said frame members, said gasket inflatable to close the space between said surfaces and form fluid tight joints between said surfaces and said filter media, said hollow gasket deflatable to clear said filter member for unobstructed movement thereof to replace said portion, means operable to inflate said gasket, a valve controlling said means, said valve in one position effecting inflation of said gasket and in a second position effecting deflation of said gasket, a control responsive to predetermined increase in pressure on one side of said filter media portion to actuate said valve to said second position, and a control responsive to predetermined movement of said filter media to actuate said valve to said one position.

4. A fluid filtering apparatus comprising, a pair of frame members for interposition in a fluid flow duct and having opposed surfaces spaced apart in fixed relation, a filter media extending between the fixed opposed surfaces of said frame members and movable to replace the portion of said media within the space between said frame members, a hollow gasket between the spaced surfaces of said frame members, said gasket inflatable to close the space between said surfaces and form fluid tight joints therebetween and with said filter media, said hollow gasket deflatable to clear said filter media for unobstructed movement thereof in replacement of the filter media portion, means operable to inflate said gasket, a control responsive to a condition of the fluid on one side of said filter medium, to actuate said means and deflate said gasket, means operable to move said filter media, a delayed action control controlled by said responsive control to delay movement of the filter media pending deflation of said gasket, and a control responsive to predetermined movement of said filter media operable to effect inflation of said gasket.

References Cited in the file of this patent

UNITED STATES PATENTS

| | | |
|---|---|---|
| 915,616 | Mackintosh | Mar. 16, 1909 |
| 920,909 | Brewer | May 11, 1909 |
| 1,549,840 | Lemoine | Aug. 18, 1925 |
| 1,632,760 | Jones | June 14, 1927 |
| 1,651,495 | Watson | Dec. 6, 1927 |
| 1,879,474 | Pontoppidan | Sept. 27, 1932 |
| 1,982,639 | Christofferson | Dec. 4, 1934 |
| 2,152,900 | Manning | Apr. 4, 1939 |
| 2,303,262 | Dunmire | Nov. 24, 1942 |
| 2,665,812 | Crane | Jan. 12, 1954 |
| 2,675,129 | Doubleday | Apr. 13, 1954 |
| 2,691,446 | Murray | Oct. 12, 1954 |